US009762976B2

(12) United States Patent
Sadr et al.

(10) Patent No.: US 9,762,976 B2
(45) Date of Patent: Sep. 12, 2017

(54) SYSTEMS AND METHODS FOR DETECTING PATTERNS IN SPATIO-TEMPORAL DATA COLLECTED USING AN RFID SYSTEM

(75) Inventors: Ramin Sadr, Los Angeles, CA (US); Christopher Richard Jones, Pacific Palisades, CA (US)

(73) Assignee: Mojix, Inc., Los Angeles, CA (US)

( * ) Notice: Subject to any disclaimer, the term of this patent is extended or adjusted under 35 U.S.C. 154(b) by 0 days.

(21) Appl. No.: 13/087,354

(22) Filed: Apr. 14, 2011

(65) Prior Publication Data
US 2011/0254664 A1    Oct. 20, 2011

Related U.S. Application Data

(60) Provisional application No. 61/324,282, filed on Apr. 14, 2010.

(51) Int. Cl.
*H04Q 9/00*      (2006.01)
*G06Q 10/08*    (2012.01)

(52) U.S. Cl.
CPC ............ *H04Q 9/00* (2013.01); *G06Q 10/087* (2013.01); *H04Q 2209/47* (2013.01);
(Continued)

(58) Field of Classification Search
CPC .......... G06K 19/0717; G06K 7/10009; G06K 2017/0045; G06K 7/10405; H04B 5/0062; H04W 52/0245
(Continued)

(56) References Cited

U.S. PATENT DOCUMENTS

| 7,479,875 B2* | 1/2009 | Fehling .................. G06Q 10/06 340/3.1 |
| 7,649,491 B2* | 1/2010 | Ohara ..................... G01S 13/84 342/118 |

(Continued)

FOREIGN PATENT DOCUMENTS

| CN | 200947246 Y | 9/2007 |
| JP | 2004005511 A | 1/2004 |

(Continued)

OTHER PUBLICATIONS

International Search Report and Written Opinion for International Application PCT/US2011/032593, Completed Jun. 30, 2011, 9 pgs.
(Continued)

*Primary Examiner* — George Bugg
*Assistant Examiner* — Munear Akki
(74) *Attorney, Agent, or Firm* — KPPB LLP

(57) ABSTRACT

Systems and methods are described that collect spatio-temporal data using an RFID system that is capable of locating the spatial position of a sensor, which is typically unaware of its location. Such systems and methods can be contrasted with conventional RFID systems in that they are able to determine the location of sensors in space as opposed to with respect to read zones related to the underlying RFID reader infrastructure. One embodiment includes an RFID system having a plurality of read zones and configured to obtain the spatio-temporal state of sensors within a sensor cloud, where the spatio-temporal state of each sensor includes sensor information, a time stamp, and a spatial location specified independently of the read zones of the RFID system, a spatio-temporal database configured to store spatio-temporal state of a plurality of sensors over time, and an application server configured to trigger events based upon
(Continued)

the detection of at least one condition by applying at least one filter to the data within the spatio-temporal database.

21 Claims, 4 Drawing Sheets

(52) U.S. Cl.
CPC . *H04Q 2209/753* (2013.01); *H04Q 2209/823* (2013.01); *H04Q 2209/886* (2013.01)

(58) Field of Classification Search
USPC .......................... 340/10.1, 8.1, 572.1, 10.41
See application file for complete search history.

(56) References Cited

U.S. PATENT DOCUMENTS

| | | | |
|---|---|---|---|
| 7,668,794 B2 | 2/2010 | Wang et al. | |
| 7,693,681 B2 | 4/2010 | Yamada | |
| 7,738,554 B2 * | 6/2010 | Lin | H04N 19/176 375/240.03 |
| 8,072,311 B2 | 12/2011 | Sadr et al. | |
| 8,095,923 B2 * | 1/2012 | Harvey | G06F 8/36 717/103 |
| 2003/0234730 A1 | 12/2003 | Arms et al. | |
| 2005/0206555 A1 * | 9/2005 | Bridgelall | G01S 5/14 342/127 |
| 2006/0022800 A1 | 2/2006 | Pattabhiraman et al. | |
| 2006/0273905 A1 * | 12/2006 | Choi | G06K 19/07749 340/572.1 |
| 2007/0101118 A1 | 5/2007 | Raghunath et al. | |
| 2007/0257795 A1 * | 11/2007 | Overhultz | 340/572.1 |
| 2007/0265799 A1 * | 11/2007 | Yamada | G01S 1/68 702/152 |
| 2007/0265866 A1 * | 11/2007 | Fehling | G06Q 10/06 340/506 |
| 2009/0146832 A1 * | 6/2009 | Ebert | G06K 17/00 340/8.1 |
| 2010/0127875 A1 * | 5/2010 | Wong | G06K 7/0008 340/572.7 |

FOREIGN PATENT DOCUMENTS

| | | |
|---|---|---|
| JP | 2004326595 A | 11/2004 |
| JP | 2006284557 A | 10/2006 |
| JP | 2007298441 A | 11/2007 |
| JP | 2008050101 A | 3/2008 |
| JP | 2009018944 A | 1/2009 |
| WO | 02082395 A1 | 10/2002 |
| WO | 2011130582 A1 | 10/2011 |

OTHER PUBLICATIONS

Extended European Search Report for European Application No. 11769632.8, Search completed Sep. 27, 2016, Mailed Oct. 6, 2016, 10 Pgs.

* cited by examiner

SYSTEMS AND METHODS FOR DETECTING PATTERNS IN SPATIO-TEMPORAL DATA COLLECTED USING AN RFID SYSTEM

CROSS-REFERENCE TO RELATED APPLICATIONS

The current application claims priority under 35 U.S.C. §119(e) to U.S. Provisional Patent Application No. 61/324,282 filed Apr. 14, 2010, entitled "Systems and Methods for Event Generation Based Upon Spatio-Temporal Data Collected Using an RFID System" the disclosure of which is incorporated by reference herein in its entirety.

BACKGROUND

The present invention relates generally to radio frequency identification (RFID) and more specifically to interpreting data generated by RFID systems.

A conventional RFID system involves locating RFID tags within read zones of RFID readers. Each of the RFID tags typically includes an identification sequence enabling identification of the tag, when it responds within the read zone of an RFID reader. The precision with which the RFID system can locate an RFID tag is determined by the size of the read zones of each of the RFID readers. A typical RFID system builds a data set from RFID tag reads, where each read indicates a unique identifier, has an associated time stamp, and indicates a read zone. When the read zones of RFID readers overlap, analysis of information such as the read rate of a specific RFID tag by different readers can be used to determine the zone in which the RFID tag actually resides.

Many RFID systems are deployed in support of real world business processes. The term business process is used here to describe a sequence of activities that are performed in response to predetermined conditions in a real world environment. Examples of business processes include, but are not limited to, assembly, packaging, sorting, shipping and receiving. As assets move through a supply chain, they are typically the subject of numerous business processes. Significant amounts of data can be generated by RFID systems related to movement of assets during the performance of business processes. The data can be collected and rules and/or queries (collectively fillers) can be applied to the collected data. When location precision is limited to zones defined by the placement of RFID readers, placement of the RFID readers becomes important to obtaining information that is relevant to coarse asset movements. For example, determining whether goods are within a specific staging area typically involves placing RFID readers in such a way that the read zones of a set of readers only cover the staging area. Such a system tends to be static. Therefore, changing a business process can necessitate moving the RFID infrastructure (i.e. the RFID readers and any associated cabling and sensor hardware) in order to obtain information that is useful to support the new business process. In addition, the information concerning motion of assets is limited to dwell times within and transitions between read zones.

SUMMARY OF THE INVENTION

Systems and methods are described that collect spatio-temporal data using an RFID system that is capable of locating the spatial position of a sensor, which is typically unaware of its location, using an RFID reader system. Such RFID systems and methods can be contrasted with conventional RFID systems in that they are able to determine the location of sensors in space as opposed to with respect to read zones related to the underlying RFID reader infrastructure. In addition, such systems are able to apply fillers to the spatial locations of sensors collected over time (i.e. spatio-temporal data) that involve spatial conditions (i.e. allowed spatial locations) that are defined independently of the read zones of the underlying RFID reader infrastructure. In many embodiments, RFID systems utilize event driven actions and data driven actions to enhance real world business processes occurring within a sensor cloud.

One embodiment includes obtaining the spatio-temporal state of a plurality of sensors within the sensor cloud using the RFID system, where the spatio-temporal state of each sensor includes sensor information, a time stamp, and a spatial location specified independently of the read zones of the RFID system, storing the spatio-temporal state of the plurality of sensors within a spatio-temporal database, applying at least one filter to the spatio-temporal data to detect the presence of at least one condition, and triggering at least one event based upon the detection of the at least one condition.

In a further embodiment, the spatial location is specified as a spatial co-ordinate.

In another embodiment, the spatial coordinate specifies a unique position in 3-dimensional space.

In a still further embodiment, the spatio-temporal state of at least one sensor also includes at least one value selected from the group consisting the identity of a device within the RFID system that was activated to obtain the sensor data, the phase of the signal from the sensor received by a RFID receiver, and the direction of arrival of the signal received from the sensor by a RFID receiver.

In still another embodiment, the calculation of the spatial location of each sensor does not rely upon the receipt by the sensor of a signal generated by a device that does not form part of the RFID system.

In a yet further embodiment, the filter applied to the spatio-temporal data to detect the presence of at least one condition comprises at least one spatial condition, where each spatial condition specifies at least one spatial location independently of the read zones of the RFID system.

In yet another embodiment, the filter detects whether a sensor is present within the at least one spatial location specified by the at least one spatial condition.

In a further embodiment again, the filter also detects whether the spatio-temporal data collected concerning a sensor having a spatio-temporal state that satisfies the at least one spatial condition also satisfies a temporal condition.

In another embodiment again, the filter also detects whether the spatio-temporal state of a sensor that satisfies the at least one spatial condition includes sensor data that satisfies a data condition.

In a further additional embodiment, the filter applied to the spatio-temporal data to detect the presence of at least one condition comprises a sequence of spatial conditions, where each spatial condition specifies at least one spatial location independently of the read zones of the RFID system.

In another additional embodiment, the filter detects whether a sensor moves between the spatial locations specified by the sequence of spatial conditions.

In a still yet further embodiment, the filter also detects whether the spatio-temporal data collected concerning a sensor having a trajectory that satisfies the sequence of spatial conditions also satisfies at least one temporal condition.

In still yet another embodiment, the filter also detects whether the spatio-temporal state of a sensor having a trajectory that satisfies the sequence of spatial conditions includes sensor data that satisfies a data condition.

In a still further embodiment again, the filter applied to the spatio-temporal data to detect the presence of at least one condition detects motion of a sensor.

In still another embodiment again, the event triggered by the filter is the reading of a sensor that is determined to be in motion by an RFID system to obtain the spatio-temporal state of the sensor.

A still further additional embodiment also includes applying a time based filter to condition the spatio-temporal data within the spatio-temporal database.

In still another additional embodiment, the event is selected from the group consisting of sending a notification, initiating a sensor read using the RFID system, activating a device, and initiating a process.

In a still yet further embodiment again, the sensor cloud comprises sensors selected from the group consisting of binary detectors, passive RFID tags, active RFID tags, and RFID tags that include transducers.

Another further embodiment includes an RFID reader system having a plurality of read zones and configured to obtain the spatio-temporal state of sensors within a sensor cloud, where the spatio-temporal state of each sensor includes sensor information, a time stamp, and a spatial location specified independently of the read zones of the RFID reader system, a spatio-temporal database configured to store spatio-temporal state of a plurality of sensors over time, and an application server configured to trigger events based upon the detection of at least one condition by applying at least one filler to the data within the spatio-temporal database.

In another further embodiment again, the application server is configured to apply fillers including at least one spatial condition, where each spatial condition specifies at least one spatial location independently of the read zones of the RFID reader system.

DETAILED DESCRIPTION OF THE INVENTION

Figure 1:
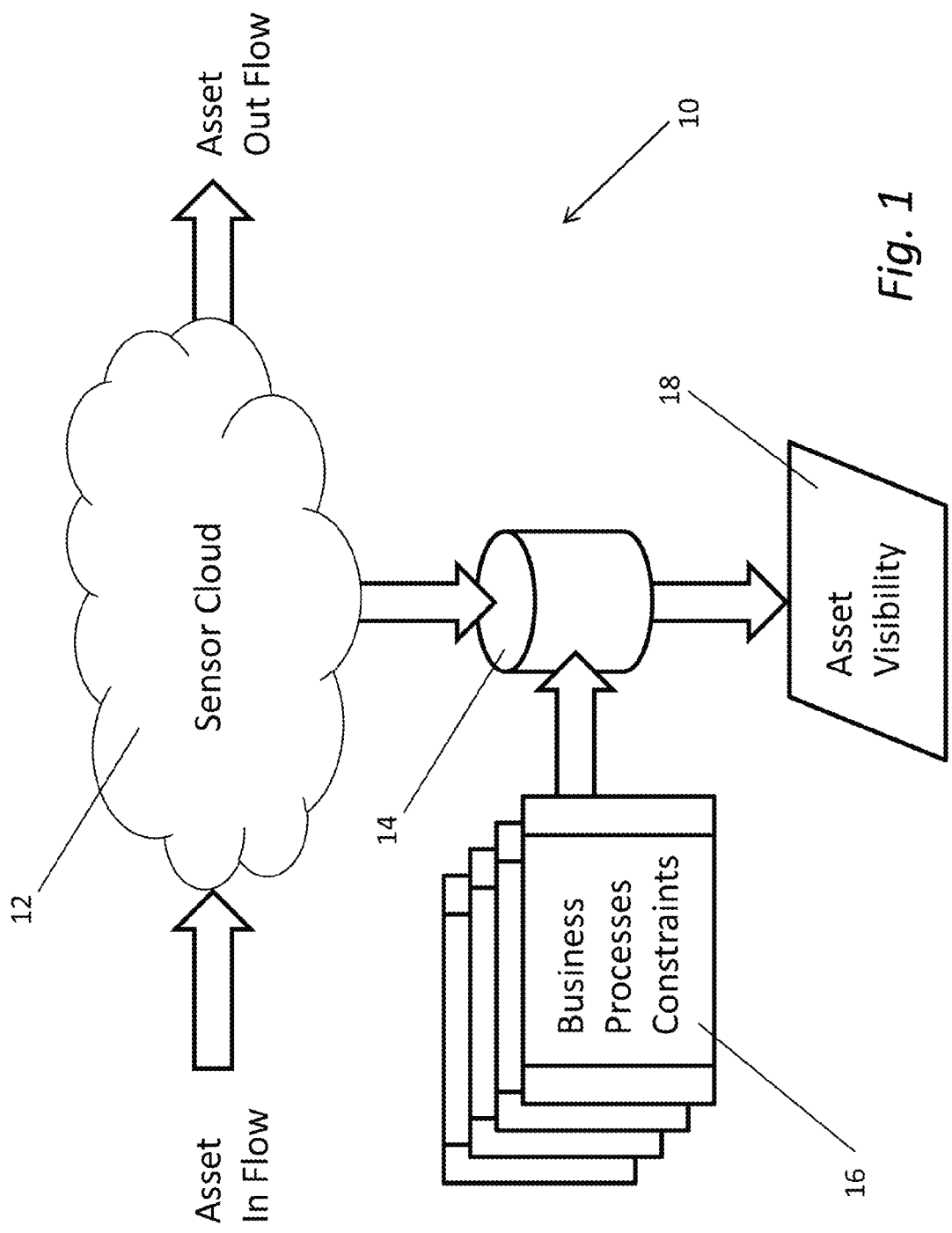
FIG. 1 illustrates a process involving collection of spatio-temporal data from a sensor cloud and applying fillers to the spatio-temporal data to provide asset visibility and to trigger actions in accordance with an embodiment of the invention.

Turning now to the drawings, RFID systems in accordance with embodiments of the invention are described that are configured to build spatio-temporal databases of sensor information and to detect and respond to patterns of data within the spatio-temporal database. In many embodiments, the RFID system is capable of locating the spatial position of sensors within a sensor cloud. The term sensor cloud refers to all of the sensors that are visible within the coverage area of an RFID system. As information is collected from the sensors, the RFID system can build a spatio-temporal database that describes the spatio-temporal trajectories of the sensors. Filters can be applied to the data within the spatio-temporal database based upon a priori knowledge of real world actions or business processes that are likely to be applied to assets within the sensor cloud.

The ability of an RFID system in accordance with an embodiment of the invention to locate the spatial position of sensors at a given time as opposed to simply identifying the presence of a sensor within a read zone enables the RFID system to respond to the spatial location and/or the trajectory of sensors instead of in terms of the presence or absence of sensors within read zones determined by the underlying RFID reader infrastructure. The RFID system can react to information obtained via application of a filler to spatio-temporal data in any of a variety of ways including but not limited to tracking the occurrence of an event, sending an alert message, sending a signal to activate one or more devices, and/or initiating a process. Furthermore, modification of real world business processes need not involve modification of the underlying RFID reader infrastructure. As real world business processes change, a modified set of fillers can be defined and enforced upon the spatio-temporal data collected from the sensor cloud by the RFID system. In many embodiments, event based fillers are applied to a spatio-temporal database of sensor information. In several embodiments, time based fillers are applied to a spatio-temporal database of sensor information. Systems and methods for collecting spatio-temporal data from the sensor cloud and applying fillers and/or constraints are discussed further below.

The Sensor Cloud

RFID systems in accordance with embodiments of the invention rely on the presence of a sensor cloud in order to build a spatio-temporal database of sensor information. The term sensor is used here to describe any device, which measures a physical quantity and provides information to the RFID system. Sensors can be as simple as a binary detector, such as a motion detector. Passive RFID tags are devices that harvest energy from electromagnetic waves and when powered by an incident signal, the tag responds with the information embedded in the device, typically preprogrammed with an identification sequence. More sophisticated RFID devices may embed sensor circuits including but not limited to transducers to convert various forms of energy, such as energy arising from chemical interaction, electromagnetic or thermal couplers to sense temperature, or piezoelectric transducers to measure pressure. The term sensor also encompasses sensors with an embedded battery, such as active RFID tags. As can be readily appreciated from the above description, the term sensor is not restricted to obtaining any particular type of information or usage of any specific energy source.

Collection of Spatio-Temporal Data from the Sensor Cloud

Collection of spatio-temporal data from the sensor cloud involves use of an RFID system that is capable of obtaining the spatial location of a sensor. A distinction can be made between an RFID system obtaining the spatial location of a sensor, and a sensor obtaining its spatial location (i.e. independently collecting information from which spatial location can be determined). The RFID system is considered to obtain the spatial location of a sensor, when the calculation of the spatial location of the sensor does not rely upon the receipt of a signal by the sensor generated by a device that does not form part of the RFID system. Many classes of sensor include the capability of obtaining their own spatial location, (e.g. devices equipped with Global Position System (GPS) receivers or that are able to determine location based upon RF sources other than the RFID system). Such devices enable the calculation of spatial location based upon signals received from devices. When the sensor independently collects information from a source other than the RFID system that is used in determining the spatial location of the system, the sensor is considered to have obtained its spatial location independently of the RFID system.

An RFID system that can only express the location of an RFID tag in terms of read zones is typically incapable of generating spatio-temporal data (i.e. the data generated is specified in terms of the location of the underlying RFID infrastructure instead of the spatial location of the sensor). In several embodiments, an RFID system is used to collect spatio-temporal data that is similar to the RFID system described in U.S. patent application Ser. No. 12/423,796 entitled "Radio Frequency Identification Tag Location Estimation and Tracking System and Method" to Sadr et al., filed Apr. 14, 2009, the disclosure of which is incorporated by reference herein in its entirety. In other embodiments, any RFID system that is capable of determining the spatial position of a sensor can be utilized to collect spatio-temporal data from a sensor cloud.

Definitions of Spatio-Temporal State

In many embodiments, the spatio-temporal data collected by the RFID system is referred to as the spatio-temporal state of the sensor and includes at least sensor information, a time stamp, and a spatial co-ordinate (e.g. x, y, z) or some other representation of a unique position in space. As noted above, sensor information can take any of a variety of forms including, but not limited to, an EPC identifier and/or a transducer measurement. The spatio-temporal state of a sensor can also include other data collected by an RFID system. In a number of embodiments, the spatio-temporal state of a sensor includes data derived from low level information collected by the RFID reader infrastructure such as, but not limited to, the identity of the exciter that was activated to obtain the sensor data, the phase of the received sensor signal and/or the direction of arrival of the signal received from the sensor. As can be readily appreciated, the additional data (if any) collected in order to record the spatio-temporal state of a sensor in a spatio-termporal database can be determined based upon the requirements of a specific application.

Applying Spatio-Temporal Filters

When sensors such as RFID tags are fixed to assets, an RFID system in accordance with embodiments of the invention can build a database describing the spatio-temporal trajectory of the assets as they move within a facility. The spatio-temporal trajectories provide real-time visibility of both inventory and asset location. A priori knowledge of the business processes employed within a sensor cloud can be used to define and apply filters to the collected spatio-temporal database. The RFID system can respond to information obtained by applying filters to the collected spatio-temporal data. In many embodiments, the RFID system can activate devices, initiate processes, and/or provide alerts that enable the modification of real world business processes. The collection of spatio-temporal data, the application of fillers to the collected spatio-temporal data and responses to information obtained by specific fillers in accordance with embodiments of the invention are discussed further below.

A process for building a spatio-temporal database, and applying fillers based upon knowledge of real world business processes in accordance with an embodiment of the invention is illustrated in FIG. 1. The process of collecting and analyzing spatio-temporal data 10 concerning assets within a facility involves collecting the spatio-temporal state of sensors within a sensor cloud 12 using an RFID receiver system, where the sensor cloud 12 includes sensors fixed to the assets, and budding a spatio-temporal database 14 describing the spatio-temporal trajectories of sensors within the sensor cloud. As noted in the illustrated embodiment, assets bearing sensors including but not limited to passive RFID tags can enter and leave the sensor cloud.

A set of fillers 16 are defined based upon a priori knowledge of the business processes occurring in the real world within the sensor cloud. As data is being collected in real time, these fillers can be applied to the spatio-temporal database by an application server (not shown) configured to communicate with the spatio-temporal database. In many embodiments, the application of fillers provides real-time asset visibility within the sensor cloud and enables the RFID system to respond to observed patterns within the spatio-temporal data to intervene and/or initiate business processes related to the assets within the sensor cloud. In a number of embodiments, the RFID system responds to information derived using fillers by sending notifications, activating or otherwise controlling devices configured to communicate with the RFID system via some form of machine-to-machine communication system, and/or initiating a process including but not limited to modifying the manner in which the RFID system collects information from within the sensor cloud. Processes for building spatio-temporal databases, applying fillers to provide asset visibility, and responding to conditions detected using fillers are discussed further below.

Using Filters to Detect Conditions within Sensor Cloud

RFID systems in accordance with embodiments of the invention can observe conditions within a sensor cloud by applying a filler or set of fillers to a spatio-temporal database. The RFID system can respond to the observation of the condition or a set of conditions by invoking one or more actions. In several embodiments, the actions can be event driven, and/or data driven. Event driven fillers can be applied to invoke actions that are triggered based upon the spatio-temporal trajectories of sensors within the sensor cloud. Data driven fillers can be used to invoke actions that are triggered in response to the non-spatio-temporal components of the states of one or more sensors. Filters or sets of filters can also be constructed that invoke actions based upon a combination of spatio-temporal trajectories of sensors within the sensor cloud, and non-spatio-temporal data.

Event Driven Filters

RFID systems in accordance with embodiments of the invention enable the definition of event driven fillers specified in terms of the trajectory in two or three dimensional Euclidean space of one or more sensors within the sensor cloud. Such conditions are not bound to the underlying RFID reader infrastructure and allow the triggering of actions in response to a wide array of motions. As is discussed further below, simple filters can be generated involving presence detection or motion detection. More complex motion filters detect the movement of a sensor between a sequence of locations. The sophistication of a presence detection filter or a motion filter can be further increased by placing temporal constraints on the amount of time at which a sensor can dwell at a specific location.

Figure 2:
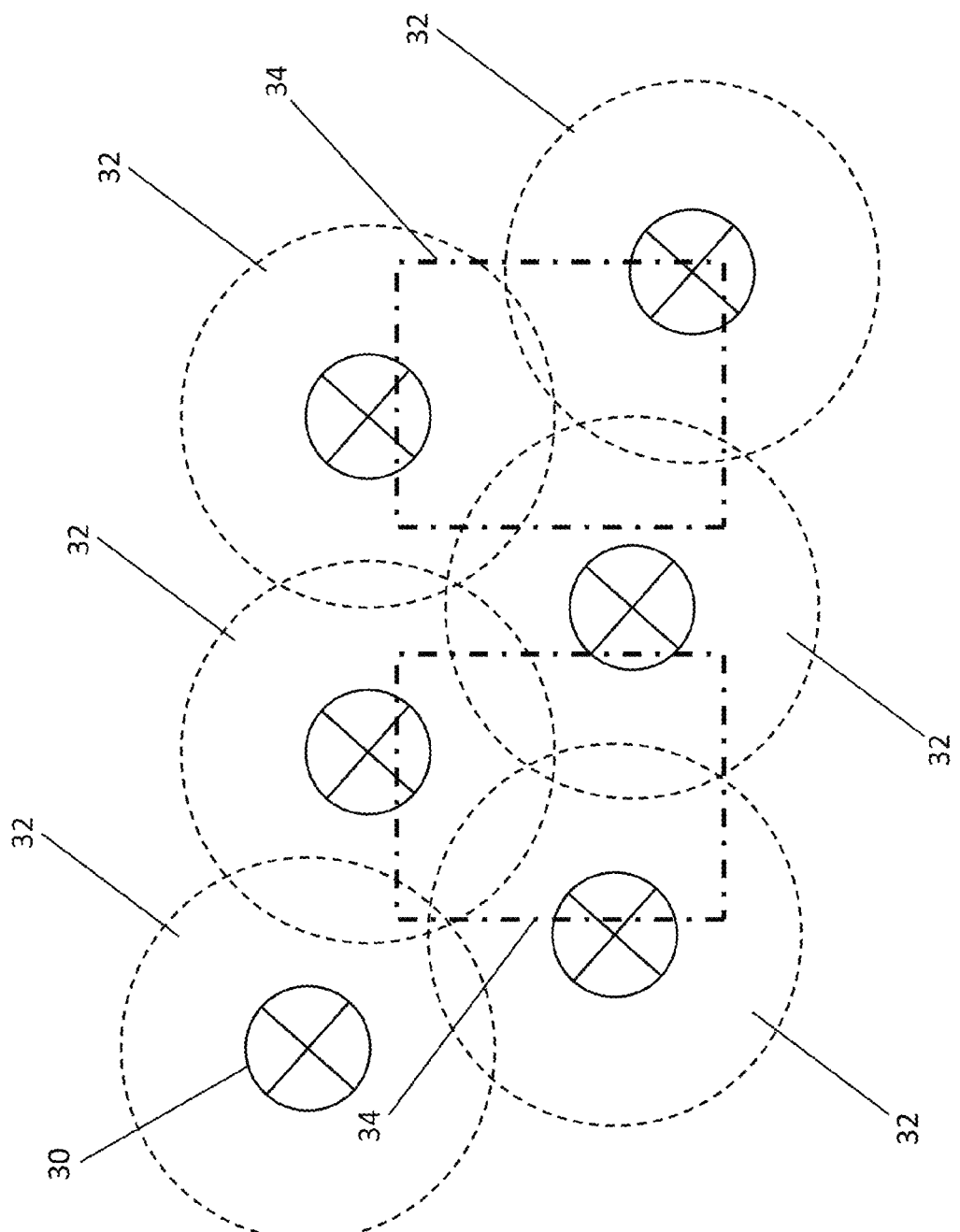
FIG. 2 conceptually illustrates spatial constraints defined within the coverage area of an RFID system in accordance with an embodiment of the invention.

In order to illustrate the operation of various event driven filters, a pair of spatial conditions (i.e. sets of allowed spatial locations) that define two dimensional areas within Euclidean space are conceptually illustrated in FIG. 2. A number of RFID exciters or readers 30 can be distributed throughout an area, which can be read in read zones 32 defined by the underlying RFID exciter/reader infrastructure. Due to the ability of an RFID system in accordance with embodiments of the invention to collect spatio-temporal data, the spatio-temporal trajectory of RFID tags through the coverage area can be determined.

As can be appreciated from the illustrated embodiment, spatial conditions 34, 36 for event based filters can be defined independently of the boundaries of the read zones of the RFID exciters/readers. In the illustrated embodiment, two rectangular spatial conditions 34, 36 are defined so that each overlay portions of the excitation zones of a number of RFID exciters/readers. Although rectangular two dimensional spatial conditions are shown, any of variety of spatial conditions, including but not limited to, three dimensional spatial conditions that are appropriate to a specific application can be utilized in accordance with embodiments of the invention. As is discussed further below, once spatial conditions are defined, various categories of event driven filters can be applied to a spatio-temporal database generated by an RFID system in accordance with an embodiment in order to trigger actions under appropriate conditions.

Presence Detection

In its simplest form, an event driven filter can simply detect whether a particular sensor is located at a specific spatial location or within a set of allowed spatial locations (i.e. a spatial condition). Such a filter can be referred to as a presence detection filter. A presence detection filter contrasts with simply detecting whether a sensor is within a read zone of a conventional RFID receiver, because a presence detection filter utilizes the spatial location of the sensor obtained by the RFID system to determine whether a spatial condition defined independently of the read zones of the RFID system is satisfied. Accordingly, multiple overlapping or non-overlapping presence detection filters can be defined within a single read zone. As is discussed further below, the ability to define multiple allowed spatial locations independently of read zones/the underlying RFID system infrastructure can be useful not only in presence detection, but in a wide array of event based filters.

Figure 3:
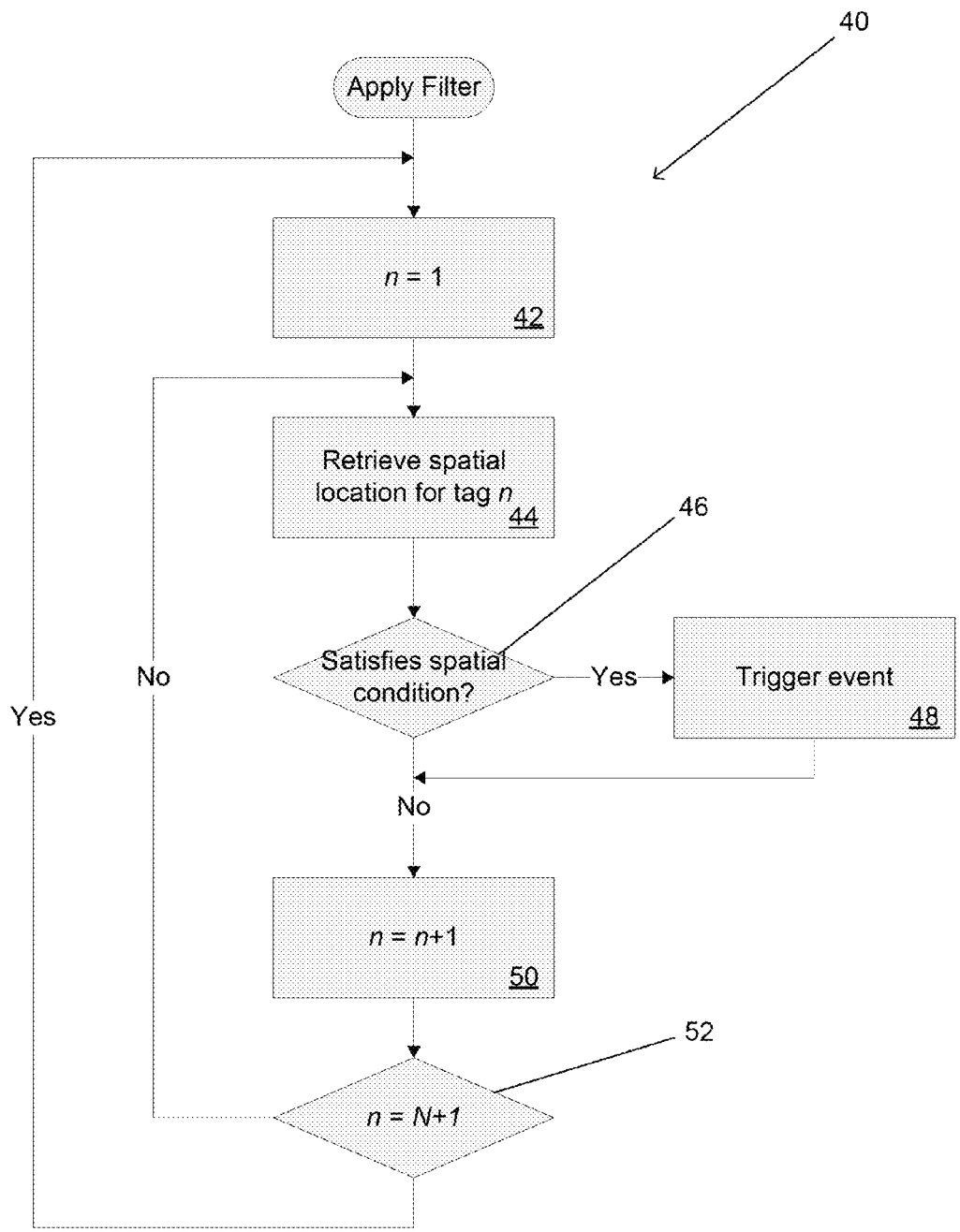
FIG. 3 is a flow chart illustrating a process for applying a presence detection filler to spatio-temporal data in accordance with an embodiment of the invention.

A process for applying a presence detection filter to spatio-temporal data for a number of sensors N in accordance with an embodiment of the invention is illustrated in FIG. 3. The process 40 involves progressively testing the spatial location information for each sensor against one or more spatial conditions and triggering events based upon the spatial conditions. In the illustrated embodiment, a counter is initialized 42 and the spatial location of each sensor is retrieved 44. A determination (46) is made concerning whether the spatial location for each tag satisfies a spatial condition. If a sensor's spatial location satisfies a spatial condition, then an event is triggered (48). In many embodiments, additional data or temporal conditions are applied to a sensor satisfying a spatial condition. In the event that the spatial condition and the data and/or temporal conditions are satisfied, then an event is triggered. The counter continues to increment (50) until a determination (52) is made that the spatial location of each sensor has been compared to the spatial condition or set of spatial conditions. Typically, the presence detection filter continuously processes the spatio-temporal data to determine whether one or more spatial conditions are satisfied by any of the sensors in real time.

Applications of presence detection filters similar to the presence detection filter shown in FIG. 3 include virtual fencing, which involves defining presence detection filters that associate sensors to a particular area or lane. For example, virtual fences can be defined using a presence detection filter enabling the triggering of a notification message in the event that perishable goods are placed in an unsafe area (e.g. removed from a refrigerated area). Virtual fencing has applications in a variety of areas including security monitoring and Electronic Article Surveillance (EAS). Security applications include defining spatial conditions that trigger an event in response to an unauthorized asset and/or person from being present within a restricted area. In EAS applications, spatial conditions can be defined that detect the unauthorized removal of an asset. Virtual fencing can be particularly useful in logistic intensive security applications, including but not limited to the tracking of airport luggage and other types of freight including parcels and mail. In a retail setting, application of presence detection filters to spatio-temporal data can be used to identify the presence of a specific person or customer. Once the presence of the customer is detected, events can be triggered that notify sales staff and/or provide customer specific shopping experiences including controlling display of advertising based upon information related to the customer.

Presence detection filters can also be applied to spatio-temporal databases to automatically aggregate assets that satisfy a spatial condition including but not limited to for the purpose of manifest generation. Additional conditions can then be applied to the aggregated assets. In many embodiments, spatial conditions can be defined that enable a determination of whether a correct group of assets is located on a pallet or within a staging area. When incorrect assets are present (i.e. either a required asset is absent or an undesired asset is present), an event can be triggered. In a retail context, similar presence detection filters can be used to detect the presence of goods within a lane adjacent a point of sale and to group the assets that are present as a single transaction. The transaction data can be compared against information collected at the point of sale. Alternatively, the asset data retrieved by the RFID system based upon the group of assets determined to be present can be used to conduct the transaction at the point of sale. Other applications of presence detection filters to aggregate assets that can be useful in a retail and/or warehouse setting include shelving applications involving counting the number of assets on a specific shell or within a specific staging area. Extensions of such filters include the remote monitoring of display placements. In an occupational health and safety context, presence detection filters can be used for a variety of purposes including but not limited to managing evacuation and mustering employees in safe areas.

Sequences of Spatial Conditions

Motion filters can be utilized to detect an allowed sequence of spatial conditions. In many embodiments, motion filters are defined in such a way that a spatio-temporal condition C specifies an allowed sequence of spatial conditions:

$$C = \bigcup_i c_i$$

where $c_i$ is a spatial condition in a sequence of spatial conditions and C is the union of each spatial condition $c_i$.

Figure 4:
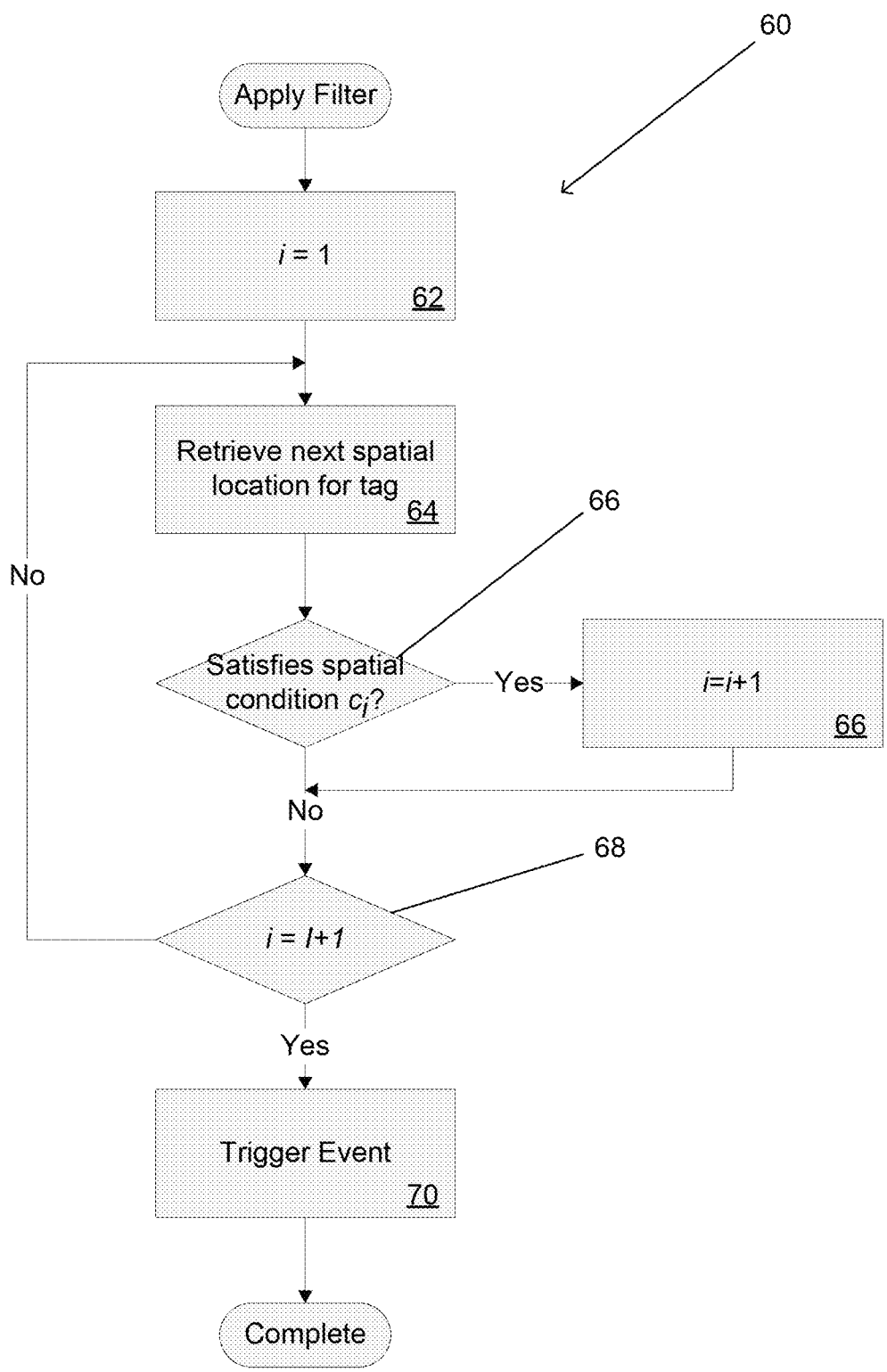
FIG. 4 is a flow chart illustrating a process for applying a motion based filler to spatio-temporal data in accordance with an embodiment of the invention.

A process for applying a motion filter to spatio-temporal data collected with respect to a specific sensor in accordance with an embodiment is illustrated in FIG. 4. The process 60 can be performed in real time or applied to spatio-temporal data that has already been collected concerning a sensor by an RFID system in accordance with an embodiment of the invention. The process 60 commences by initializing (62) a counter i that stores a value of the current spatial condition in the sequence of spatial conditions defined by the motion filter. The process retrieves (64) the spatial location for the sensor and determines (66) whether the spatial location satisfies the current spatial condition in the sequence of spatial conditions defined in the motion filter. In the event the spatial condition is satisfied, then the counter is incremented (66) and comparisons are performed between the spatial location of the sensor over time and subsequent spatial conditions in the sequence of spatial conditions. When all of the spatial conditions in the sequence of spatial conditions have been satisfied, an event is triggered (70). In many embodiments, additional data and/or time conditions are applied to the sensor and the event is triggered when these additional conditions are also satisfied.

Referring back to FIG. 2, by way of example, a motion filter can be defined that specifies that once a sensor has entered a first area 34 defined in two dimensional space, the sensor should not enter a second two dimensional area 36. Therefore, an event is triggered in the event that a sequence is detected in which an asset bearing a sensor enters the first area, and then the second area. Examples of this type of motion filter include but are not limited to motion filters that can trigger events based upon movements within a read zone, such as an item being removed from a shelf and placed back in a different location, triggering a notification of the need to re-shelve the item. Similar motion filters can be used to activate a device or machine or commence a process or operation based upon the detected movement of an asset. In a number of embodiments, motion filters include but are not limited to motion filters that monitor sequences of spatial conditions with respect to multiple sensors. Examples include but are not limited to monitoring the sequence with which different tools are used in the completion of a project and/or ensuring appropriate inventory levels or availability of assets for a specific process or sequence of operations.

Although the motion filters discussed above involve detection of specific sequences of motion, many motion filters in accordance with embodiments of the invention simply detect motion. In many embodiments, events are triggered when a sensor moves. The triggering of events in response to the motion of a sensor can be useful in improving the accuracy with which an RFID system is capable of obtaining the spatial location for sensors. In many instances, RFID readers can interfere with each other by interrogating sensors at the same time. Therefore, motion fillers can be used to restrict the interrogation of sensors to regions in which sensors are currently in motion. Furthermore, when a sensor is in motion the effects of RF degradation due to the environment are diminished thanks to spatial diversity (i.e. the sensor is transmitting from different positions as time progresses). Therefore, spatial location estimates are also more reliable when a sensor is in motion.

While specific motion fillers and specific applications of motion fillers are discussed above, any of a variety of motion fillers and applications for motion fillers can be utilized to trigger events based upon spatio-temporal data collected by an RFID system in accordance with embodiments of the invention.

Time Based Fillers

While spatio-temporal data naturally lends itself to filtering based upon allowed or prohibited motion, the temporal characteristics of the motion can also be utilized as part of the filtering process. In many embodiments, time based fillers are defined that trigger actions based upon allowed or prohibited dwell time of goods (i.e. the amount of time in which the goods have been stationary) and/or allowed or prohibited speed of movement of goods. In several embodiments, time based fillers involve adding a dwell time condition to a presence detection filler or a motion filler. In a number of embodiments, time based fillers are utilized in the storage and handling of perishable goods. For example, a time based filler can trigger an event in response to use of a perishable good in a real world business process after the expiration date of the perishable good. Time based fillers can also be useful in detecting errors within the spatio-temporal data collected by the RFID system.

Location errors can occur for a variety of reasons including reflections of RF signals used by the RFID receiver to locate sensors or blind spots in the coverage area of the RFID system. Errors in determining the location for a sensor can result in the incorrect enforcement of an event action. For example, when a sensor is incorrectly determined to be outside of a facility, an asset outflow action can be enforced resulting in the removal of the asset from the real-time inventory of the facility. Over time, however, location errors may be detected by analyzing spatio-temporal data collected by the RFID system. For example, the source of the error may be temporary or intermittent. In addition, motion of the sensor may result in the sensor moving out of a blind spot and/or into a location where the position of the sensor can be more accurately determined. Therefore, time based fillers can be applied to condition data collected by an RFID system in accordance with embodiments of the invention. In several embodiments, the time based fillers can be adaptive based upon the spatio-temporal trajectory of a sensor. When a sensor is stationary, a longer time base can be applied during the time base filtering. When a sensor is in motion, a shorter time base can be applied. In a number of embodiments, the length of the time base that is applied is determined by the latency tolerance of a specific application. In many embodiments, time base fillers are used to exclude identified spatio-temporal state data from processes that detect one or more conditions by applying fillers to the spatio-temporal data.

In several embodiments, blind spots in the coverage area can be observed over time. In a number of embodiments, spatio-temporal state estimates can be automatically provided concerning the location of sensors as they move through blind spots.

Although specific applications of time based fillers are discussed above, any of a variety of time based fillers can be applied to spatio-temporal databases to trigger events and/or condition the data in accordance with embodiments of the invention.

Data Driven Filters

As can be readily appreciated, data driven actions can be applied to a database that does not contain spatio-temporal data. While the condition that triggers a data driven action typically does not involve spatio-temporal data, the presence of spatio-temporal data in the database enables a significantly greater array of actions in response to a trigger event. For example, a data driven action can prompt the generation of a list of spatial information concerning sensors that are to be collected into a single location, such as a list of the location of sensors, which are attached to goods, that are to be picked and formed into a pallet. In other words, fillers can be applied that trigger actions designed to produce predetermined modifications to the spatio-temporal state of sensors within the sensor cloud.

As noted extensively above, spatio-temporal conditions can also be applied in combination with other types of conditions. For example, entry of a shipping request (i.e. a non-spatio-temporal condition) can prompt the RFID system to inspect subsequent spatio-temporal data to confirm that the appropriate quantity and quality of assets are shipped in a timely manner. As can be readily appreciated, the ability to define event driven actions using spatio-temporal conditions alone or in combination with other types of conditions is almost limitless and a wide variety of event driven actions appropriate to specific business processes can be readily defined in accordance with embodiments of the invention.

Modification of Business Rules without Modifying Infrastructure

Referring again to FIG. 2, event driven actions can be enforced in response to the presence of spatial and/or spatio-temporal conditions. As was noted above, the ability of RFID systems in accordance with embodiments of the invention to record the spatio-temporal trajectories of sensors enables the definition of spatial and spatio-temporal conditions in terms of two or three dimensional Euclidian space instead of in terms of read zones that are constrained to the locations of components of the underlying RFID infrastructure. Consequently, modifications of business processes can be accommodated by simply modifying the definitions of the spatial and/or spatio-temporal conditions that form the basis of the event driven actions enforced by the RFID system. Modification of the location of the underlying RFID infrastructure is not required.

Data Mining

As can be readily appreciated, the collection of spatio-temporal data by RFID systems in accordance with embodiments of the invention provides almost limitess possibilities for mining the spatio-temporal data for information that can enable improvement of real world business processes. Examples of the ways in which data mining can be used include but are not limited to observing and optimizing work flows through the sensor cloud and/or the location of reused assets within the sensor cloud to increase the efficiency with which assets are moved through a facility.

Data Aggregation

RFID systems in accordance with embodiments of the invention collect spatio-temporal data from sensors within a sensor cloud. In many embodiments, information can be aggregated across multiple RFID systems to provide visibility within all of the nodes of a supply chain. In several embodiments, the spatio-temporal data from each of the RFID systems is aggregated into a single spatio-temporal database. In other embodiments, business process rules are enforced upon the spatio-temporal database to generate asset visibility data with respect to each facility and the asset visibility data is aggregated in a single database. Examples of data indicative of asset visibility include, but are not limited to, asset inflow data, asset outflow data, and inventories of specific asset classes.

Although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed:

1. A method for monitoring a sensor cloud using an RFID system having a plurality of read zones, comprising:
   obtaining the spatio-temporal state of a plurality of sensors within the sensor cloud using the RFID system, where:
      the spatio-temporal state of each sensor comprises sensor information, a time stamp, and a spatial location that is a representation of a single unique position in space in which the sensor is located, which is specified independently of the read zones of the RFID system;
      the RFID system is configured to determine the spatial location of a sensor independently of the read zones of the RFID system using information signals received from the sensor when the sensor is illuminated and without relying upon receipt by the sensor of a signal generated by a device that does not form part of the RFID system, where the spatial location is a single unique position in space in which the sensor is located; and
      the sensors are incapable of independently obtaining their own spatial location;
   storing the spatio-temporal state of the plurality of sensors within a spatio-temporal database, wherein the stored spatio-temporal state of at least one sensor comprises a first spatial location within a particular read zone with a first time stamp and a different, second spatial location within the particular read zone with a different, second time stamp;
   determining whether the spatio-temporal data satisfies at least one spatial condition based on the first and second spatial locations within the particular read zone; and
   triggering at least one event based upon determining that the spatio-temporal data satisfies the at least one condition.

2. The method of claim 1, wherein each spatial location is specified as a spatial co-ordinate.

3. The method of claim 2, wherein the spatial coordinate specifies a unique position in 3-dimensional space.

4. The method of claim 1, wherein the spatio-temporal state of the at least one sensor also comprises at least one value selected from the group consisting of the identity of a device within the RFID system that was activated to obtain the sensor data, the phase of the signal from the sensor received by a RFID receiver, and the direction of arrival of the signal received from the sensor by a RFID receiver.

5. The method of claim 1, wherein the at least one spatial condition specifies whether the at least one sensor is located in a spatial region within the particular read zone.

6. The method of claim 5, wherein determining whether the spatio-temporal data satisfies at least one spatial condition comprises determining whether at least one of the first and second spatial locations of the at least one sensor is present within the spatial region specified by the at least one spatial condition.

7. The method of claim 6, wherein determining whether the spatio-temporal data satisfies at least one spatial condition comprises determining whether the spatio-temporal data satisfies a temporal condition based on the first time stamp and the second time stamp.

8. The method of claim 6, wherein determining whether the spatio-temporal data satisfies at least one spatial condition comprises determining whether the spatio-temporal state satisfies a data condition.

9. The method of claim 1, wherein determining whether the spatio-temporal data satisfies at least one spatial condition comprises determining whether the spatio-temporal data satisfies a sequence of spatial conditions, where the sequence of spatial conditions specifies at least a first and a second region within the particular read zone.

10. The method of claim 9, wherein determining whether the spatio-temporal data satisfies at least one spatial condition comprises determining whether a sensor moves between the first and second spatial regions specified by the sequence of spatial conditions.

11. The method of claim 1, further comprising recording a spatio-temporal trajectory based on the first and second spatial locations and the first and second time stamps of the at least one sensor through the particular read zone.

12. The method of claim 10, wherein the determining whether the spatio-temporal data satisfies at least one spatial condition comprises determining whether the spatio-temporal state of a sensor follows a trajectory that satisfies the sequence of spatial conditions and comprises sensor data that satisfies a data condition.

13. The method of claim 1, wherein determining whether the spatio-temporal data satisfies at least one spatial condition comprises detecting motion of a sensor.

14. The method of claim 13, wherein triggering the event comprises reading of a sensor that is determined to be in motion by the RFID system to obtain the spatio-temporal state of the sensor.

15. The method of claim 14, further comprising determining whether the spatio-temporal data within the spatio-temporal database satisfies a time-based condition based on the time stamps of the spatio-temporal data.

16. The method of claim 1, wherein the event is selected from the group consisting of sending a notification, initiating a sensor read using the RFID system, activating a device, and initiating a process.

17. The method of claim 1, wherein the sensor cloud comprises sensors selected from the group consisting of binary detectors, passive RFID tags, active RFID tags, and RFID tags that include transducers.

18. An RFID system, comprising:
  an RFID reader system having a plurality of read zones and configured to obtain the spatio-temporal state of sensors within a sensor cloud, where:
   the spatio-temporal state of each sensor comprises sensor information, a time stamp, and a spatial location that is a representation of a single unique position in space in which the sensor is located, which is specified independently of the read zones of the RFID reader system;
   the RFID system is configured to determine the spatial location of a sensor independently of the read zones of the RFID system using information signals received from the sensor when the sensor is illuminated and without relying upon receipt by the sensor of a signal generated by a device that does not form part of the RFID system, where the spatial location is a single unique position in space in which the sensor is located; and
   the sensors are incapable of independently obtaining their own spatial location;
  a spatio-temporal database configured to store spatio-temporal state of a plurality of sensors over time, wherein the stored spatio-temporal state of at least one sensor comprises a first spatial location within a particular read zone with a first time stamp and a different, second spatial location within the particular read zone with a different, second time stamp; and
  an application server configured to trigger events based upon determining that the spatio-temporal data within the spatio-temporal database satisfies at least one spatial condition based on the first and second spatial locations.

19. The RFID system of claim 18, wherein the at least one spatial condition specifies a plurality of spatial regions within the particular read zone.

20. The method of claim 1, wherein the sensor is for measuring a physical condition and the sensor information comprises data regarding the measured physical condition of the sensor.

21. The method of claim 1, wherein obtaining the spatio-temporal state comprises:
  receiving signals at each of a plurality of antennas from the particular sensor, where the signals are responsive to illumination of the sensor by a sequence of interrogation signals transmitted at different frequencies; and
  determining a spatial location for the sensor based upon known positions of the plurality of anennas and triangulation of the tag based up on the observed changes in phase in response to changes in frequency at each of the plurality of antennas.

* * * * *